US009303732B2

(12) United States Patent
Eo et al.

(10) Patent No.: US 9,303,732 B2
(45) Date of Patent: Apr. 5, 2016

(54) AUTOMATED MANUAL TRANSMISSION FOR VEHICLE

(71) Applicant: Hyundai Motor Company, Seoul (KR)

(72) Inventors: Soon Ki Eo, Ansan-si (KR); Chon Ok Kim, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/462,102

(22) Filed: Aug. 18, 2014

(65) Prior Publication Data

US 2015/0143936 A1    May 28, 2015

(30) Foreign Application Priority Data

Nov. 25, 2013  (KR) .................... 10-2013-0143604

(51) Int. Cl.
| F16H 3/089 | (2006.01) |
| F16H 3/12 | (2006.01) |
| F16H 3/44 | (2006.01) |
| F16H 37/04 | (2006.01) |

(52) U.S. Cl.
CPC ................. *F16H 3/12* (2013.01); *F16H 3/089* (2013.01); *F16H 2003/123* (2013.01); *F16H 2003/442* (2013.01); *F16H 2037/047* (2013.01); *F16H 2037/048* (2013.01); *Y10T 74/19284* (2015.01)

(58) Field of Classification Search
None
See application file for complete search history.

(56) References Cited

U.S. PATENT DOCUMENTS

| 5,011,463 | A  | * | 4/1991 | Jarchow et al. ................. 475/74 |
| 2003/0166429 | A1 | * | 9/2003 | Tumback ........................ 475/5 |
| 2009/0170649 | A1 | * | 7/2009 | Murakami et al. ............... 475/5 |
| 2010/0024409 | A1 | * | 2/2010 | Shiina et al. .................... 60/327 |
| 2013/0172140 | A1 | * | 7/2013 | Potter ............................. 475/5 |
| 2014/0128205 | A1 | * | 5/2014 | Phillips et al. ............... 475/303 |

FOREIGN PATENT DOCUMENTS

| JP | 2004-210116 A | 7/2004 |
| JP | 2009-250276 A | 10/2009 |
| JP | 2010-216605 A | 9/2010 |
| KR | 10-2010-0057673 A | 5/2010 |
| KR | 10-1241167 B1 | 3/2013 |

* cited by examiner

*Primary Examiner* — Justin Holmes
(74) *Attorney, Agent, or Firm* — Morgan, Lewis & Bockius LLP

(57) ABSTRACT

An automated manual transmission for a vehicle may include an input shaft (INPUT) configured to allow a rotational force to be transmitted from a power source, an output shaft configured to be disposed in parallel with the input shaft so as to draw out power, and a plurality of shifting gear pairs including driving gears and driven gears installed on the input shaft and the output shaft respectively so as to be circumscribed in pairs and provide different shifting stages for respective pairs, wherein at least two of the shifting gear pairs are respectively configured so that one of the driving gear and the driven gear is connected to the input shaft or the output shaft so as to control power by planetary gearsets, and the other is connected to the input shaft or the output shaft so as to control power by a synchronizer.

10 Claims, 2 Drawing Sheets

AUTOMATED MANUAL TRANSMISSION FOR VEHICLE

CROSS REFERENCE TO RELATED APPLICATION

The present application claims priority of Korean Patent Application Number 10-2013-0143604 filed on Nov. 25, 2013, the entire contents of which is incorporated herein for all purposes by this reference.

BACKGROUND OF THE INVENTION

1. Field of the Invention

The present invention relates, in general, to a transmission for a vehicle and, more particularly, to a structure of an automated manual transmission.

2. Description of Related Art

Automated manual transmissions allow gear ratios to be automatically changed by an actuator during use of a vehicle, so that they can provide convenience similar to automatic transmissions, and contribute to improving fuel efficiency of a vehicle because they have better power transmission efficiency than the automatic transmissions.

However, in the case of automated manual transmissions based on a synchromesh type of shifting mechanism, the moment power is inevitably cut takes place while the gear ratios are automatically changed by the actuator. In this case, torque is reduced and an unsmooth shifting phenomenon, that feels as when the vehicle is being momentarily jerked backwards, is generated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an automated manual transmission is configured to partly use a mechanism of a conventional manual transmission in which power is momentarily cut and then transmitted during shifting and further simplify the configuration to exclude a reduction in torque transmitted to driving wheels to the maximum extent during shifting, thereby preventing a shifting characteristic from being negatively affected to be able to provide a soft stable shifting characteristic and to improve fuel efficiency of a vehicle and competitive power of the vehicle.

In an aspect of the present invention, an automated manual transmission for a vehicle may include an input shaft (INPUT) configured to allow a rotational force to be transmitted from a power source, an output shaft (OUTPUT) configured to be disposed in parallel with the input shaft (INPUT) so as to draw out power, and a plurality of shifting gear pairs including driving gears and driven gears installed on the input shaft (INPUT) and the output shaft (OUTPUT) respectively so as to be circumscribed in pairs and provide different shifting stages for respective pairs, wherein at least two of the shifting gear pairs are respectively configured so that one of the driving gear and the driven gear is connected to the input shaft (INPUT) or the output shaft (OUTPUT) so as to control power by planetary gearsets, and the other is connected to the input shaft (INPUT) or the output shaft (OUTPUT) so as to control power by a synchronizer.

The two shifting gear pairs connected to control the power by the planetary gearsets and the synchronizer are connected in common to a first planetary gearset (PG1) that is one of the planetary gearsets.

The two shifting gear pairs connected in common to the first planetary gearset (PG1) are shifting gear pairs providing two neighboring shifting stages between which one shifting stage is interposed among a series of shifting stages.

The shifting gear pair, which provides the shifting stage between the two shifting stages provided by the two shifting gear pairs connected in common to the first planetary gearset (PG1), is connected to a second planetary gearset (PG2) different from the first planetary gearset (PG1) so as to control the power.

The two shifting gear pairs connected in common to the first planetary gearset (PG1) are shifting gear pairs providing 1-speed and 3-speed shifting stages, and the shifting gear pair providing a 2-speed shifting stage is connected to the second planetary gearset (PG2).

The first planetary gearset (PG1) is configured so that a first sun gear (S1) is fixedly installed on the input shaft (INPUT), a 1-speed driving gear (1D) of the 1-speed shifting gear pair providing the 1-speed shifting stage and a 3-speed driving gear (3D) of the 3-speed shifting gear pair providing the 3-speed shifting stage is integrally connected to a first carrier (C1) of the first planetary gearset (PG1), and a first ring gear (R1) of the first planetary gearset (PG1) is installed to be fixed by a first brake (B1).

A 1-speed driven gear (1P) of the 1-speed shifting gear pair is rotatably installed on the output shaft (OUTPUT), the output shaft (OUTPUT) may include a 1-speed synchronizer intermittently connecting the 1-speed driven gear (1P) to the output shaft (OUTPUT), a sleeve of the 1-speed synchronizer is integrally formed with a reverse driven gear (RP), the input shaft (INPUT) may include a reverse driving gear (RD), and a reverse idler (RI) is provided between the reverse driven gear (RP) and the reverse driving gear (RD) and selectively engaged thereto.

The different shifting gear pair providing the shifting stage adjacent to one of the two shifting stages provided by the two shifting gear pairs commonly connected to the first planetary gearset (PG1) is further connected to the second planetary gearset (PG2), and the shifting stages provided by the shifting gear pairs connected to the first planetary gearset (PG1) and the shifting stages provided by the shifting gear pairs connected to the second planetary gearset (PG2) form the shifting stages that alternate with one another in turn.

The first planetary gearset (PG1) is configured so that a first sun gear (S1) is fixed to the input shaft (INPUT), and two driving gears for forming the two different shifting stages are integrally connected to a first carrier (C1), a first brake (B1) is provided to fix a first ring gear (R1) of the first planetary gearset (PG1), the second planetary gearset (PG2) is configured so that a second sun gear (S2) is fixed to the input shaft (INPUT), and two driving gears for forming the two different shifting stages are integrally connected to a second carrier (C2), a second brake (B2) is provided to fix a second ring gear (R2) of the second planetary gearset (PG2), and a multistage synchronizer (MS) is installed on the input shaft (INPUT) so as to allow the first carrier (C1) or the second carrier (C2) to be connected to or disconnected from the input shaft (INPUT).

1-speed and 3-speed driving gears (1D and 3D) for providing 1-speed and 3-speed shifting stages are connected to the first carrier (C1) of the first planetary gearset (PG1), 2-speed and 4-speed driving gears (2D and 4D) for providing 2-speed and 4-speed shifting stages are connected to the second carrier (C2) of the second planetary gearset (PG2), a 1-speed driven gear (1P) forming a shifting gear pair with the 1-speed driving gear (1D), a 2-speed driven gear (2P) forming a shifting gear pair with the 2-speed driving gear (2D), a 3-speed driven gear (3P) forming a shifting gear pair with the 3-speed driving gear (3D), and a 4-speed driven gear (4P) forming a shifting gear pair with the 4-speed driving gear (4D) are rotatably installed on the output shaft (OUTPUT). a 1-3-speed synchronizer (1-3S) is installed between the 1-speed driven gear (1P) and the 3-speed driven gear (3P) so as to allow the 1-speed driven gear (1P) or the 3-speed driven gear (3P) to be connected to or disconnected from the output shaft (OUTPUT), and a 2-4-speed synchronizer (2-4S) is installed between the 2-speed driven gear (2P) and the 4-speed driven gear (4P) so as to allow the 2-speed driven gear (2P) or the 4-speed driven gear (4P) to be connected to or disconnected from the output shaft (OUTPUT).

The automated manual transmission mat further may include an idler shaft (IDS) installed to be parallel to the input shaft (INPUT) and the output shaft (OUTPUT), a first reverse gear (RV1) that is fixed to the idler shaft (IDS) and is engaged with the 1-speed driving gear (1D), a reverse driven gear (RP) integrally formed with a sleeve of the 1-3-speed synchronizer (1-3S), a second reverse gear (RV2) that is rotatably installed on the idler shaft (IDS) and is engaged with the reverse driven gear (RP), and a reverse synchronizer (RVS) provided for the idler shaft (IDS) so as to allow the second reverse gear (RV2) to be connected to or disconnected from the idler shaft (IDS).

According to an exemplary embodiment of the present invention, the automated manual transmission can partly use a mechanism of a conventional manual transmission in which power is momentarily cut and then transmitted during shifting, and further simplify the configuration to exclude a reduction in torque transmitted to driving wheels to the maximum extent during shifting. Thereby, it is possible to prevent a shifting characteristic from being negatively affected, to provide a soft stable shifting characteristic to improve fuel efficiency of a vehicle and competitive power of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
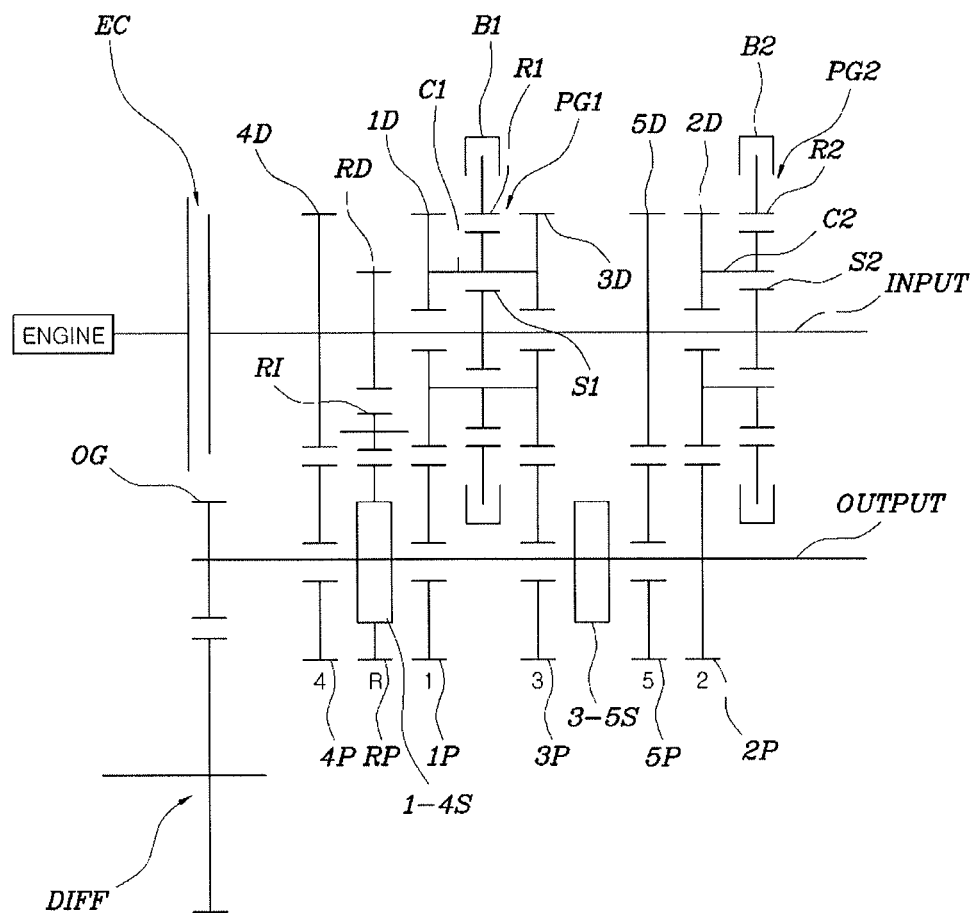
FIG. 1 shows an automated manual transmission for a vehicle according to a various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinbelow, exemplary embodiments of the present invention will be described in detail with reference to the accompanying drawings.

Figure 2:
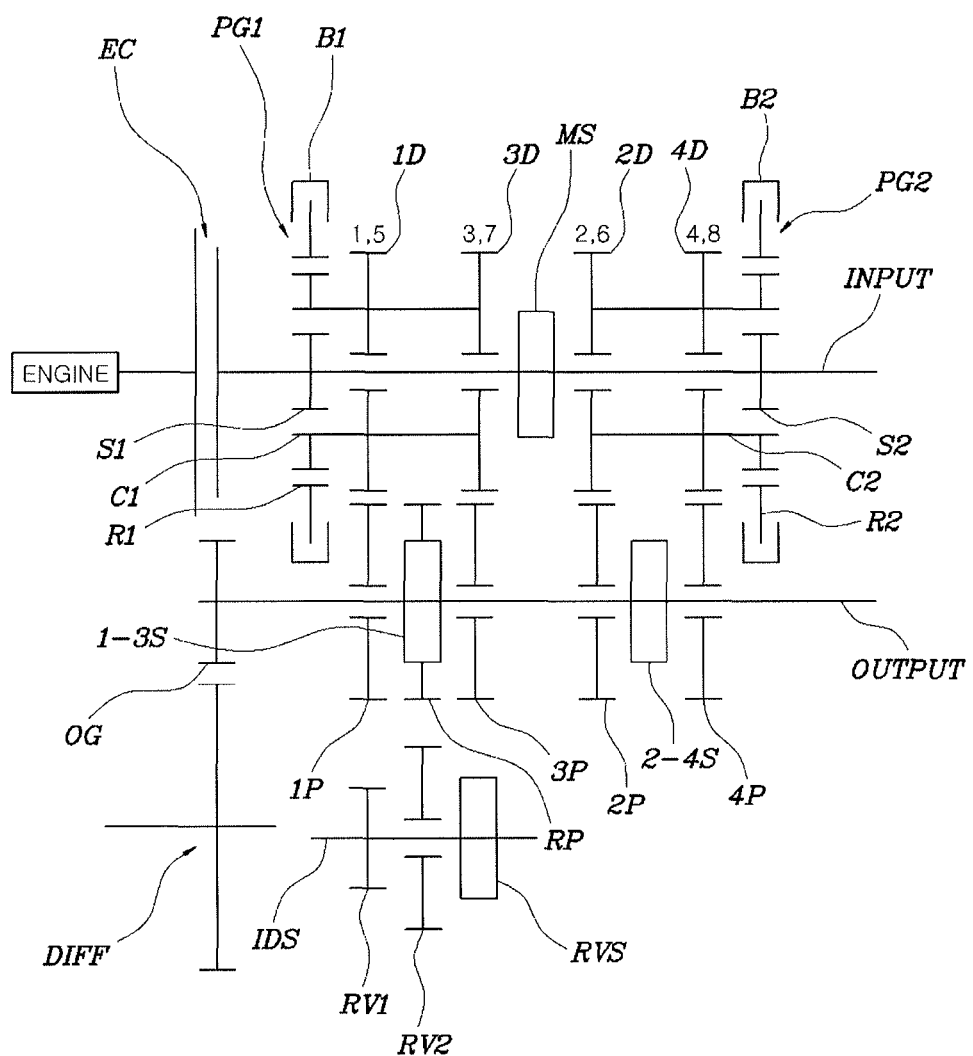
FIG. 2 shows an automated manual transmission for a vehicle according to a various exemplary embodiments of the present invention.

Referring to FIGS. 1 and 2, an automated manual transmission for a vehicle according to exemplary embodiments of the present invention includes an input shaft INPUT configured to allow a rotating force to be transmitted from a power source, an output shaft OUTPUT configured to be disposed parallel with the input shaft INPUT and be able to draw out power, and a plurality of shifting gear pairs made up of driving gears and driven gears installed on the input shaft INPUT and the output shaft OUTPUT so as to be circumscribed in pairs and provide different shifting stages for respective pairs. At least two of the shifting gear pairs are respectively configured so that one of the driving gear and the driven gear is connected to the input shaft INPUT or the output shaft OUTPUT so as to be able to control power by planetary gearsets, and so that another is connected to the input shaft INPUT or the output shaft OUTPUT so as to be able to control power by a synchronizer.

The two shifting gear pairs connected to be able to control the power by the planetary gearset and the synchronizer are connected in common to a first planetary gearset PG1 that is one planetary gearset. In the present embodiments, the driving gears of the shifting gear pairs are connected to the input shaft INPUT so as to be able to control the power by the planetary gearset, and the driven gears are connected to the output shaft OUTPUT so as to be able to control the power by the synchronizer. Alternatively, the driving gears may be connected to the input shaft INPUT so as to be able to control the power by the synchronizer, and the driven gears may be connected to the output shaft OUTPUT so as to be able to control the power by the planetary gearset.

The two shifting gear pairs connected in common to the first planetary gearset PG1 are shifting gear pairs providing two neighboring shifting stages between which one shifting stage is interposed among a series of shifting stages. The shifting gear pair, which provides the shifting stage between the two shifting stages provided by the two shifting gear pairs connected in common to the first planetary gearset PG1, is connected to a second planetary gearset PG2 different from the first planetary gearset PG1 so as to be able to control the power.

In detail, in the various exemplary embodiments of FIG. 1, the two shifting gear pairs connected in common to the first planetary gearset PG1 are shifting gear pairs providing 1-speed and 3-speed shifting stages, and the shifting gear pair providing a 2-speed shifting stage is connected to the second planetary gearset PG2.

A first sun gear S1 of the first planetary gearset PG1 is fixedly installed on the input shaft INPUT. A 1-speed driving gear 1D of the 1-speed shifting gear pair providing the 1-speed shifting stage and a 3-speed driving gear 3D of the 3-speed shifting gear pair providing the 3-speed shifting stage are integrally connected to a first carrier C1 of the first planetary gearset PG1, and a first ring gear R1 of the first planetary gearset PG1 is installed to be able to be fixed by a first brake B1.

A 1-speed driven gear 1P of the 1-speed shifting gear pair is rotatably installed on the output shaft OUTPUT. The output shaft OUTPUT is provided with a 1-speed synchronizer that connects the 1-speed driven gear 1P to the output shaft OUTPUT so as to be able to control the power. A reverse driven gear RP is integrally provided for a sleeve of the 1-speed synchronizer. The input shaft INPUT is provided with a reverse driving gear RD. A reverse idler RI is disposed between the reverse driven gear RP and the reverse driving gear RD.

Here, a 4-speed driven gear 4P of the 4-speed shifting gear pair is rotatably provided for the output shaft OUTPUT on the left side of the 1-speed driven gear 1P. The 1-speed synchronizer is configured to connect the 1-speed driven gear 1P to the output shaft OUTPUT when moving to the right side of FIG. 1, and connect the 4-speed driven gear 4P to the output shaft OUTPUT when moving to the left side. In the present embodiment, the 1-speed synchronizer is substantially a 1-4-speed synchronizer. Hereinafter, the 1-speed synchronizer is thus referred to as the "1-4-speed synchronizer 1-4S."

The reverse idler RI is configured to slide in an axial direction and be engaged with or disengaged from the reverse driven gear RP and the reverse driving gear RD so as to be able to form or release a reverse stage. In this way, as the reverse idler RI can be disposed on the same row as the 1-4-speed synchronizer 1-4S, a total length of the transmission can be reduced.

Further, a 5-speed driven gear 5P of the 5-speed shifting gear pair is rotatably provided for the output shaft OUTPUT on the right side of the 3-speed driven gear 3P engaged with the 3-speed driving gear 3D. A 3-5-speed synchronizer 3-5S is provided between the 3-speed driven gear 3P and the 5-speed driven gear 5P so as to allow the 3-speed driven gear 3P or the 5-speed driven gear 5P to be selectively connected to the output shaft OUTPUT. Thereby, a forward shifting stage having a total of five speeds can be realized.

Further, a 4-speed driving gear 4D engaged with the 4-speed driven gear 4P is integrally provided for the input shaft INPUT, and a 5-speed driving gear 5D engaged with the 5-speed driven gear 5P is integrally provided for the input shaft INPUT.

A second sun gear S2 of the second planetary gearset PG2 is fixedly installed on the input shaft INPUT. A 2-speed driving gear 2D of the 2-speed shifting gear pair providing the 2-speed shifting stage is integrally connected to a second carrier C2 of the second planetary gearset PG2. A second ring gear R2 of the second planetary gearset PG2 is installed to be able to be fixed by a second brake B2.

Here, the 2-speed driven gear 2P is installed to be integrally connected to the output shaft OUTPUT. A left end of the output shaft OUTPUT is provided with an output gear OG so as to be able to draw out power through a differential DIFF.

In the various exemplary embodiments configured as described above, an engine is started with the engine clutch EC released. For 1-speed departure, the 1-speed driven gear 1P is connected to the output shaft OUTPUT by the 1-4-speed synchronizer 1-4S. In this state, when the first brake B1 is operated to engage the engine clutch EC, the engine power is transmitted from the input shaft INPUT to the 1-speed driving gear 1D after being reduced at the first planetary gearset PG1, and is reduced at the 1-speed driven gear 1P again. Thereby, 1-speed output is drawn out through the output shaft OUTPUT.

The 1-speed gear is shifted to the 2-speed gear by slowly operating the second brake B2 to cause the power of the input shaft INPUT to be drawn out to the output shaft OUTPUT through the 2-speed driving gear 2D and the 2-speed driven gear 2P, and slowly releasing the first brake B1 at the same time. After the first brake B1 is completely released, the 1-4-speed synchronizer 1-4S is released to a neutral state.

In detail, the first brake B1 is slowly released under slip control, and the second brake B2 is slowly operated under slip control at the same time. Thereby, during shifting from the 1-speed gear to the 2-speed gear, the shifting to the 2-speed gear is smoothly performed without reducing the torque of the output shaft OUTPUT.

Afterwards, during shifting to the 3-speed gear, the 3-speed driven gear 3P is connected to the output shaft OUTPUT by the 3-5-speed synchronizer 3-5S. In this state, when the first brake B1 is slowly operated under slip control while the second brake B2 is slowly released under slip control, the shifting to the 3-speed gear is performed without reducing the torque of the output shaft OUTPUT.

Next, shifting to the 4-speed gear or shifting to the 5-speed gear is performed as in a typical automated manual transmission by disengaging the engine clutch EC, engaging the synchronizer of the corresponding shifting stage, and then engaging the engine clutch EC.

In the present embodiment, among a total of five speeds for the forward shifting stage, the 1-speed to the 3-speed gears that are relatively low speeds are adapted to prevent the torque from being reduced during shifting so as to be able to improve a shifting characteristic, and the 4-speed and the 5-speed gears at which such torque reduction occurring during shifting does not exert a relatively great influence on the shifting are adapted to maintain a typical shifting system with no change so as to be able to sufficiently improve and secure the shifting characteristic at a minimum cost.

Alternatively, both of the 4-speed and the 5-speed gears may be changed without reducing the torque using the technical spirit of the present invention. Hereinafter, the present exemplary embodiment will be described as a various exemplary embodiments.

Configuration of the various exemplary embodiments of the present invention is mostly equal to that of the various exemplary embodiments, and is partly different from that of the various exemplary embodiments. Therefore, the common configuration will be omitted, and the different configuration will be mainly described.

In the various exemplary embodiments of FIG. 2, two shifting gear pairs commonly connected to a first planetary gearset PG1, and provide two shifting stages. A different shifting gear pair providing a shifting stage adjacent to one of the two shifting stages is further connected to a second planetary gearset PG2. The shifting stages provided by the shifting gear pairs connected to the first planetary gearset PG1 and the shifting stages provided by the shifting gear pairs connected to the second planetary gearset PG2 form shifting stages that alternate with one another in turn.

In detail, the two shifting gear pairs commonly connected to the first planetary gearset PG1 are a 1-speed shifting gear pair and a 3-speed shifting gear pair, and the two shifting gear pairs commonly connected to the second planetary gearset PG2 are a 2-speed shifting gear pair and a 4-speed shifting gear pair. In this way, the 1-speed to 4-speed gears are formed to alternate with one another in turn so as to be connected to the first planetary gearset PG1 and the second planetary gearset PG2.

The first planetary gearset PG1 is configured so that a first sun gear S1 is fixed to an input shaft INPUT, and so that two driving gears for forming two different shifting stages are integrally connected to a first carrier C1. A first brake B1 is provided to be able to fix a first ring gear R1 of the first planetary gearset PG1. The second planetary gearset PG2 is configured so that a second sun gear S2 is fixed to the input shaft INPUT, and so that two driving gears for forming two different shifting stages are integrally connected to a second carrier C2. A second brake B2 is provided to be able to fix a second ring gear R2 of the second planetary gearset PG2. A multistage synchronizer MS is installed on the input shaft INPUT so as to allow the first carrier C1 or the second carrier C2 to be connected/disconnected to/from the input shaft INPUT.

In detail, the 1-speed and 3-speed driving gears 1D and 3D for providing 1-speed and 3-speed shifting stages are connected to the first carrier C1 of the first planetary gearset PG1, and the 2-speed and 4-speed driving gears 2D and 4D for providing 2-speed and 4-speed shifting stages are connected to the second carrier C2 of the second planetary gearset PG2. When the first carrier C1 of the first planetary gearset PG1 is connected to the input shaft INPUT by the multistage synchronizer MS, all components of the first planetary gearset PG1 are rotated at the same time. As a result, the 1-speed and 3-speed driving gears 1D and 3D connected to the first carrier C1 have the same number of revolutions as the input shaft INPUT. As shown in FIG. 2, the 1-speed driving gear 1D realizes 5-speed, and the 3-speed driving gear 3D realizes 7-speed. When the second carrier C2 of the second planetary gearset PG2 is connected to the input shaft INPUT by the multistage synchronizer MS, the 2-speed and 4-speed driving gears 2D and 4D connected to the second carrier C2 function as 6-speed and 8-speed driving gears, respectively.

The first planetary gearset PG1 or the second planetary gearset PG2 is adapted to allow power from the input shaft INPUT to be output by the multistage synchronizer MS so as to switch a reduced state and an unchanged state. Thereby, 5-speed to 8-speed shifting stages can be additionally formed.

A 1-speed driven gear 1P forming a shifting gear pair with the 1-speed driving gear 1D, a 2-speed driven gear 2P forming a shifting gear pair with the 2-speed driving gear 2D, a 3-speed driven gear 3P forming a shifting gear pair with the 3-speed driving gear 3D, and a 4-speed driven gear 4P forming a shifting gear pair with the 4-speed driving gear 4D are rotatably installed on an output shaft OUTPUT.

A 1-3-speed synchronizer 1-3S is installed between the 1-speed driven gear 1P and the 3-speed driven gear 3P so as to allow the 1-speed driven gear 1P or the 3-speed driven gear 3P to be connected/disconnected to/from the output shaft OUTPUT. A 2-4-speed synchronizer 2-4S is installed between the 2-speed driven gear 2P and the 4-speed driven gear 4P so as to allow the 2-speed driven gear 2P or the 4-speed driven gear 4P to be connected/disconnected to/from the output shaft OUTPUT.

An idler shaft IDS is installed to be parallel to the input shaft INPUT and the output shaft OUTPUT. A first reverse gear RV1 is fixed to the idler shaft IDS, and is engaged with the 1-speed driving gear 1D. A reverse driven gear RP is integrally formed with a sleeve of the 1-3-speed synchronizer 1-3S. A second reverse gear RV2 is rotatably installed on the idler shaft IDS, and is engaged with the reverse driven gear RP. A reverse synchronizer RVS is provided for the idler shaft IDS so as to allow the second reverse gear RV2 to be connected/disconnected to/from the idler shaft IDS.

The first reverse gear RV1 is disposed on the same row as the necessary 1-speed driving gear 1D, and the second reverse gear RV2 is disposed on the same row as the essential 1-3-speed synchronizer 1-3S. The reverse synchronizer RVS is disposed on the same row as the 3-speed driving gear 3D. As such, it is possible to avoid increasing the length of the transmission in order to realize a reverse shifting stage, so that an entire length of the transmission can be reduced.

In this configuration, the reverse shifting stage is formed by engaging the reverse synchronizer RVS to cause power from the 1-speed driving gear 1D to drive the reverse driven gear RP formed on the sleeve of the 1-3-speed synchronizer 1-3S via the first reverse gear RV1 and the second reverse gear RV2.

In the various exemplary embodiments, an engine clutch EC installed on the input shaft INPUT so as to be able to be intermittently transmitted from an engine can be removed.

In other words, when the first brake B1 and the second brake B2 are released, and when the synchronizer for each shifting stage is in a neutral state, the input shaft INPUT is directly connected to the engine without the engine clutch EC. Even in this case, it is possible to interrupt the transmission of power from the input shaft INPUT to the output shaft OUTPUT and start the engine. Even in the remaining shifting processes, the engine clutch EC can also be removed by controlling the first brake B1 and the second brake B2.

In the present embodiment, when the first brake B1 is operated in a state in which the 1-speed driven gear 1P is connected to the output shaft OUTPUT by the 1-3-speed synchronizer 1-3S, the power transmitted from the engine to the input shaft INPUT is reduced at the first planetary gearset PG1, and drives the 1-speed driving gear 1D. Output is reduced again between the 1-speed driving gear 1D and the 1-speed driven gear 1P is drawn to the output shaft OUTPUT.

Shifting to the 2-speed gear needs only operation of the second brake B2 under slip control in a state in which the 2-speed driven gear 2P is connected to the output shaft OUTPUT by the 2-4-speed synchronizer, release of the first brake B1 under slip control, and release of the 1-3-speed synchronizer 1-3S in a neutral state. In this case, the torque of the output shaft OUTPUT is not reduced.

Shifting to the 3-speed gear needs only operation the first brake B1 under slip control in a state in which the 3-speed driven gear 3P is connected to the output shaft OUTPUT by the 1-3-speed synchronizer, release of the second brake B2 under slip control, and release of the 2-4-speed synchronizer 2-4S in a neutral state.

Then, shifting to the 4-speed gear needs only operation of the second brake B2 under slip control in a state in which the 4-speed driven gear 4P is connected to the output shaft OUTPUT by the 2-4-speed synchronizer 2-4S, release of the first brake B1 under slip control, and release of the 1-3-speed synchronizer 1-3S in a neutral state.

Shifting to the 5-speed gear needs only operation of the first brake B1 under slip control in a state in which the first carrier C1 is fixed to the output shaft OUTPUT by the multistage synchronizer MS and in which the 1-speed driven gear 1P is connected to the output shaft OUTPUT by the 1-3-speed synchronizer 1-3S, release of the second brake B2 under slip control, and release of the 2-4-speed synchronizer 2-4S in a neutral state.

Shifting to the 6-speed gear needs only operation of the second brake B2 under slip control in a state in which the second carrier C2 is fixed to the output shaft OUTPUT by the multistage synchronizer MS and in which the 2-speed driven gear 2P is connected to the output shaft OUTPUT by the 2-4-speed synchronizer 2-4S, release of the first brake B1 under slip control, and release of the 1-3-speed synchronizer 1-3S in a neutral state.

Processes of shifting to the 7-speed and 8-speed gears are equal to the foregoing, and will not be described.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An automated manual transmission for a vehicle comprising:
   an input shaft configured to allow a rotational force to be transmitted from a power source;
   an output shaft configured to be disposed in parallel with the input shaft so as to draw out power; and
   a plurality of shifting gear pairs including driving gears and driven gears disposed on the input shaft and the output shaft respectively so as to be circumscribed in pairs and provide different shifting stages for respective pairs,
   wherein at least two of the plurality of shifting gear pairs are respectively configured so that one of the driving gear and the driven gear of each of the at least two of the plurality of shifting gear pairs is connected to the input shaft or the output shaft so as to control power by planetary gearsets, and another of the driving gear and the driven gear of each of the at least two of the plurality of shifting gear pairs is connected to the input shaft or the output shaft so as to control power by a synchronizer,
   wherein the two shifting gear pairs connected to control the power by the planetary gearsets and the synchronizer are connected in common to a first planetary gearset that is one of the planetary gearsets,
   wherein the two shifting gear pairs connected in common to the first planetary gearset are shifting ear pairs providing two neighboring shifting stages between which one shifting stage is interposed among a series of shifting stages,
   wherein the shifting gear pair, which provides the shifting stage between the two shifting stages provided by the two shifting gear pairs connected in common to the first planetary gearset, is connected to a second planetary gearset different from the first planetary gearset so as to control the power, and
   wherein the two shifting gear pairs connected in common to the first planetary gearset are shifting gear pairs providing 1-speed and 3-speed shifting stages, and the shifting gear pair providing a 2-speed shifting stage is connected to the second planetary gearset.

2. The automated manual transmission according to claim 1, wherein:
   the first planetary gearset is configured so that a first sun gear is fixedly disposed on the input shaft;
   a 1-speed driving gear of the 1-speed shifting gear pair providing the 1-speed shifting stage and a 3-speed driving gear of the 3-speed shifting gear pair providing the 3-speed shifting stage is integrally connected to a first carrier of the first planetary gearset; and
   a first ring gear of the first planetary gearset is disposed to be fixed by a first brake.

3. The automated manual transmission according to claim 2, wherein:
   a 1-speed driven gear of the 1-speed shifting gear pair is rotatably disposed on the output shaft;
   the output shaft includes a 1-speed synchronizer intermittently connecting the 1-speed driven gear to the output shaft;
   a sleeve of the 1-speed synchronizer is integrally formed with a reverse driven gear;
   the input shaft includes a reverse driving gear; and
   a reverse idler is provided between the reverse driven gear and the reverse driving gear and selectively engaged thereto.

4. The automated manual transmission according to claim 1, wherein the different shifting gear pair providing the shifting stage adjacent to one of the two shifting stages provided by the two shifting gear pairs commonly connected to the first planetary gearset is further connected to the second planetary gearset, and the shifting stages provided by the shifting gear pairs connected to the first planetary gearset and the shifting stages provided by the shifting gear pairs connected to the second planetary gearset form the shifting stages that alternate with one another in turn.

5. The automated manual transmission according to claim 4, wherein:
   the first planetary gearset is configured so that a first sun gear is fixed to the input shaft, and two driving gears for forming the two different shifting stages are integrally connected to a first carrier;
   a first brake is provided to fix a first ring gear of the first planetary gearset;
   the second planetary gearset is configured so that a second sun gear is fixed to the input shaft, and two driving gears for forming the two different shifting stages are integrally connected to a second carrier;
   a second brake is provided to fix a second ring gear of the second planetary gearset; and
   a multistage synchronizer is disposed on the input shaft so as to allow the first carrier or the second carrier to be connected to or disconnected from the input shaft.

6. The automated manual transmission according to claim 5, wherein:
   1-speed and 3-speed driving gears for providing 1-speed and 3-speed shifting stages are connected to the first carrier of the first planetary gearset;
   2-speed and 4-speed driving gears for providing 2-speed and 4-speed shifting stages are connected to the second carrier of the second planetary gearset;
   a 1-speed driven gear forming a shifting gear pair with the 1-speed driving gear, a 2-speed driven gear forming a shifting gear pair with the 2-speed driving gear, a 3-speed driven gear forming a shifting gear pair with the 3-speed driving gear, and a 4-speed driven gear forming a shifting gear pair with the 4-speed driving gear are rotatably disposed on the output shaft;
   a 1-3-speed synchronizer is disposed between the 1-speed driven gear and the 3-speed driven gear so as to allow the 1-speed driven gear or the 3-speed driven gear to be connected to or disconnected from the output shaft; and
   a 2-4-speed synchronizer is disposed between the 2-speed driven gear and the 4-speed driven gear so as to allow the 2-speed driven gear or the 4-speed driven gear to be connected to or disconnected from the output shaft.

7. The automated manual transmission according to claim 6, further comprising:

an idler shaft disposed to be parallel to the input shaft and the output shaft;

a first reverse gear that is fixed to the idler shaft and is engaged with the 1-speed driving gear;

a reverse driven gear integrally formed with a sleeve of the 1-3-speed synchronizer;

a second reverse gear that is rotatably disposed on the idler shaft and is engaged with the reverse driven gear; and a reverse synchronizer provided for the idler shaft so as to allow the second reverse gear to be connected to or disconnected from the idler shaft.

8. An automated manual transmission for a vehicle comprising:

an input shaft configured to allow a rotational force to be transmitted from a power source;

an output shaft configured to be disposed in parallel with the input shaft so as to draw out power; and a plurality of shifting gear pairs including driving gears and driven gears disposed on the input shaft and the output shaft respectively so as to be circumscribed in pairs and provide different shifting stages for respective pairs, wherein at least two of the plurality of shifting gear pairs are respectively configured so that one of the driving gear and the driven gear of each of the at least two of the plurality of shifting gear pairs is connected to the input shaft or the output shaft so as to control power by planetary gearsets, and another of the driving gear and the driven gear of each of the at least two of the plurality of shifting gear pairs is connected to the input shaft or the output shaft so as to control power by a synchronizer, wherein the two shifting gear pairs connected to control the power by the planetary gearsets and the synchronizer are connected in common to a first planetary gearset that is one of the planetary gearsets, wherein the two shifting gear pairs connected in common to the first planetary gearset are shifting gear pairs providing two neighboring shifting stages between which one shifting stage is interposed among a series of shifting stages, wherein the shifting gear pair, which provides the shifting stage between the two shifting stages provided by the two shifting gear pairs connected in common to the first planetary gearset, is connected to a second planetary gearset different from the first planetary gearset so as to control the power, wherein the different shifting gear pair providing the shifting stage adjacent to one of the two shifting stages provided by the two shifting gear pairs commonly connected to the first planetary gearset is further connected to the second planetary gearset, and the shifting stages provided by the shifting gear pairs connected to the first planetary gearset and the shifting stages provided by the shifting gear pairs connected to the second planetary gearset form the shifting stages that alternate with one another in turn, and wherein:

the first planetary gearset is configured so that a first sun gear is fixed to the input shaft, and two driving gears for forming the two different shifting stages are integrally connected to a first carrier;

a first brake is provided to fix a first ring gear of the first planetary gearset;

the second planetary gearset is configured so that a second sun gear is fixed to the input shaft, and two driving gears for forming the two different shifting stages are integrally connected to a second carrier;

a second brake is provided to fix a second ring gear of the second planetary gearset; and a multistage synchronizer is disposed on the input shaft so as to allow the first carrier or the second carrier to be connected to or disconnected from the input shaft.

9. The automated manual transmission according to claim 8, wherein:

1-speed and 3-speed driving gears for providing 1-speed and 3-speed shifting stages are connected to the first carrier of the first planetary gearset;

2-speed and 4-speed driving gears for providing 2-speed and 4-speed shifting stages are connected to the second carrier of the second planetary gearset;

a 1-speed driven gear forming a shifting gear pair with the 1-speed driving gear, a 2-speed driven gear forming a shifting gear pair with the 2-speed driving gear, a 3-speed driven gear forming a shifting gear pair with the 3-speed driving gear, and a 4-speed driven gear forming a shifting gear pair with the 4-speed driving gear are rotatably disposed on the output shaft;

a 1-3-speed synchronizer is disposed between the 1-speed driven gear and the 3-speed driven gear so as to allow the 1-speed driven gear or the 3-speed driven gear to be connected to or disconnected from the output shaft; and a 2-4-speed synchronizer is disposed between the 2-speed driven gear and the 4-speed driven gear so as to allow the 2-speed driven gear or the 4-speed driven gear to be connected to or disconnected from the output shaft.

10. The automated manual transmission according to claim 9, further comprising:

an idler shaft disposed to be parallel to the input shaft and the output shaft;

a first reverse gear that is fixed to the idler shaft and is engaged with the 1-speed driving gear;

a reverse driven gear integrally formed with a sleeve of the 1-3-speed synchronizer;

a second reverse gear that is rotatably disposed on the idler shaft and is engaged with the reverse driven gear; and a reverse synchronizer provided for the idler shaft so as to allow the second reverse gear to be connected to or disconnected from the idler shaft.

\* \* \* \* \*